Jan. 19, 1965   J. M. EIDSON   3,165,959
CUTTING MACHINE HAVING MEANS TO CONTROL SIZE OF CUT MATERIAL
Filed Nov. 6, 1961   6 Sheets-Sheet 1

INVENTOR.
J. Marvin Eidson
BY
Ooms, McDougall and Hersh
Attys

INVENTOR.
J. Marvin Eidson

Jan. 19, 1965 J. M. EIDSON 3,165,959
CUTTING MACHINE HAVING MEANS TO CONTROL SIZE OF CUT MATERIAL
Filed Nov. 6, 1961 6 Sheets-Sheet 4

INVENTOR.
J. Marvin Eidson
BY
Dons, McDougall and Hersh
Att'ys

FIG. 8

3,165,959
CUTTING MACHINE HAVING MEANS TO
CONTROL SIZE OF CUT MATERIAL
James M. Eidson, Atlanta, Ga., assignor to Anderson Machine and Tool Works, Inc., Chaska, Minn., a corporation of Minnesota
Filed Nov. 6, 1961, Ser. No. 150,388
14 Claims. (Cl. 83—174)

This invention relates to an improved material cutting machine and it relates more particularly to a machine for cutting cloth, mattress panels, quilted materials and the like. The machine is designed whereby it will handle bolts of material, quilted webs coming from a quilting machine or other materials presented in a continuous or non-continuous manner.

It is one object of this invention to provide an improved cloth cutting machine which is capable of handling and cutting materials including mattress panels and quilted materials in a completely automatic fashion.

It is a more particular object of this invention to provide an automatic cloth cutting machine which is capable of automatically measuring out pieces of material to a predetermined length, die cutting or rounding off corners in the predetermined pieces and then cutting the material to the desired length.

It is an additional object of this invention to provide a cloth cutting machine which will achieve the foregoing objects while handling bolts of material, quilted webs coming from a quilting machine and various other types of materials.

These and other objects of this invention will appear hereinafter and, for purposes of illustration, but not of limitation, specific embodiments of this invention are shown in the accompanying drawings in which—

*General description of the machine*

Figure 1:
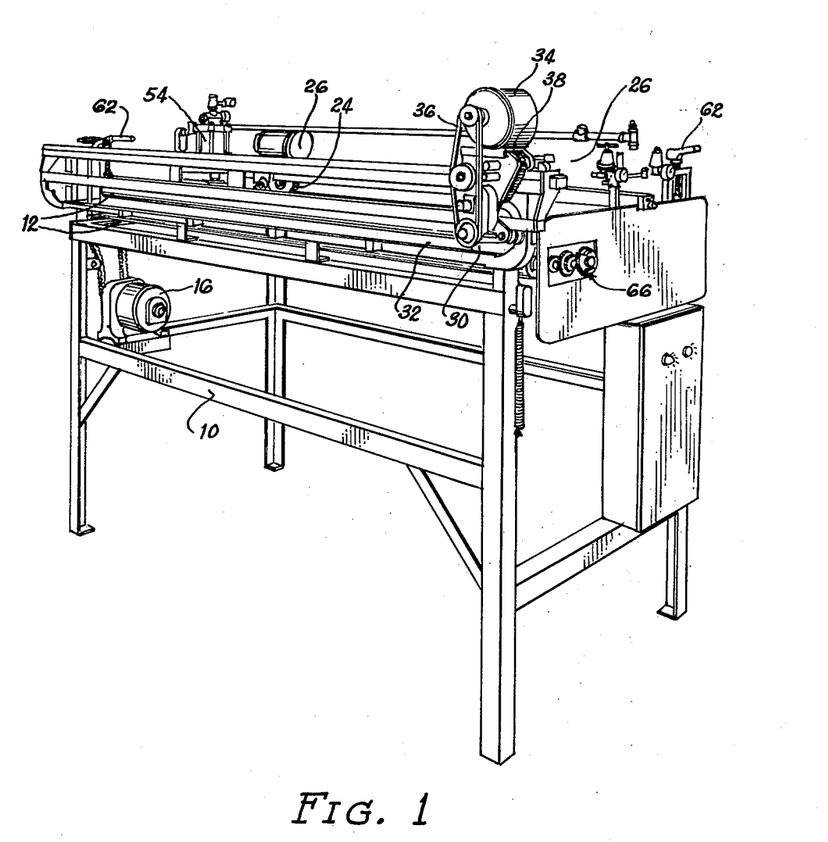
FIGURE 1 is a perspective view of a cloth cutting machine characterized by the features of this invention.
Figure 2:
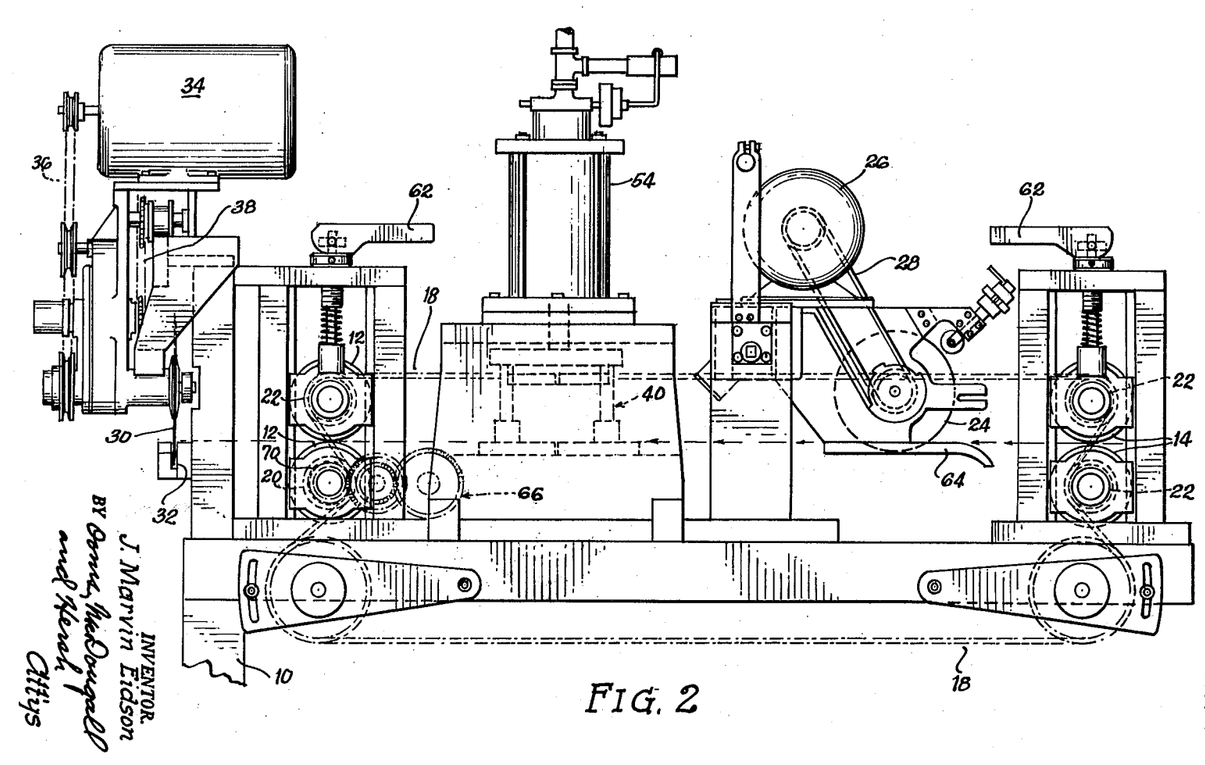
FIGURE 2 is a side elevation of the apparatus shown in FIGURE 1.

The material cutting machine of this invention is exemplified by the specific embodiment thereof shown in the accompanying drawings. The machine includes a frame 10 supporting two sets of rollers 12 and 14 which comprise the drive mechanism for carrying the material through the machine. A motor 16 is mounted on the frame for driving the rollers 12 and 14 by means of a chain drive 18. The motor 16 is adapted to drive gear 20 which is directly connected to the lower roller 12 (FIGURE 2). The chain 18, driven by the gear 20, drives gears 22 which are connected to the upper roller 12 and rollers 14.

The machine is provided with a pair of rotary trimming knives 24 which are driven by means of motors 26 and associated belts 28. The trimming knives are positioned on either side of the machine and trim the edges of the material in a conventional fashion to provide a desired width in the cut material.

A cutoff device, which is positioned at the end of the machine opposite the delivery end, includes a rotary knife 30 which travels transversely of the material within the slot 32. The motor 34 serves to rotate the knife 30 by means of the belt 36 and the knife is passed along the slot 32 through operation of the motor and associated chain drive 38.

The cloth cutting apparatus is also provided with a pair of notching dies 40 positioned on either side of the material as it passes through the machine. The dies are made operative when it is desired to round the corners of the lengths of material produced. As will appear hereinafter, the dies can be made inoperative where rounded corners are not desired.

Figure 6:
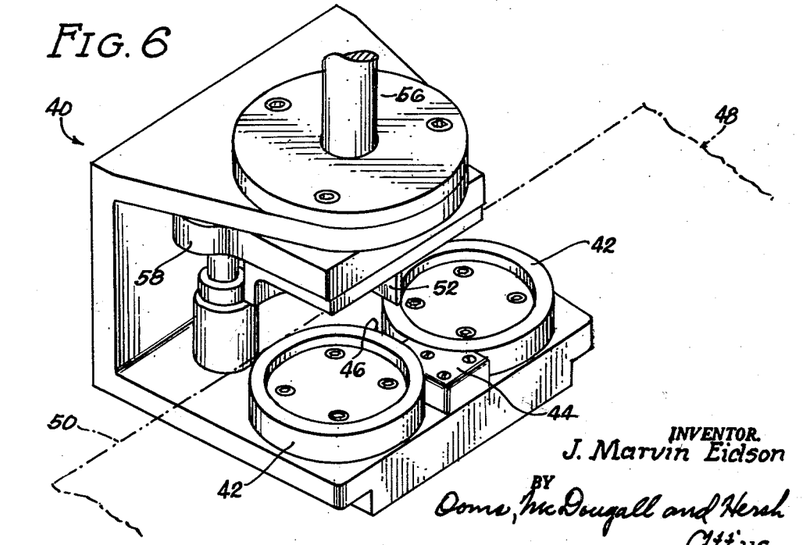
FIGURE 6 is a perspective view of a notching mechanism employed in the automatic cutting sequence.

FIGURE 6 illustrates in detail the notching die preferably employed. The die comprises circular members 42 and closure member 44 which define an opening 46. Material passing through the machine in the direction of the arrow will ride on the members 42 and 44, and the trimmed edge 50 of the material will pass tangent to the circumference of the members 42. When it is desired to notch the material, the control means (to be described) for the machine will cause stopping of the material movement. Notching tool 52, which is dimensioned to exactly fit within the opening 46, will then be forced downwardly through the operation of the pneumatic cylinder 54 (FIGURE 2) on the piston 56 and plate 58. A notching device is positioned on either side of the machine and the coils 110 and 112, described with reference to the circuit, are adapted to be simultaneously energized to actuate the pneumatic cylinder 54.

It will be apparent that this operation will result in the removal of a piece from the material corresponding to the cross-section of the opening 46. The control means of this invention are adapted to restart the material and to then stop the material when the notched out portions are centrally located with respect to the cutoff knife 30. Operation of the cutoff knife will then divide the material along a line through the center of the notched out portions and a rectangular piece of material with corners rounded in accordance with the radius of members 42 will result.

*General description of the machine operation*

In the operation of the cloth cutting machine illustrated, the trimming knives 24 are set for a predetermined material width and rotation thereof is commenced without starting the drive rollers 12 and 14. Roll release cams 62 are operated to open a space between the rollers and material is hand fed between the front rollers 14 and over the guide plate 64 whereby the material edges will be trimmed. Hand feeding is continued whereby the trimmed material will be passed through the notching dies and between the rear rollers 12. At this time, the cams 62 are operated to close the rollers 12 and 14 in running position.

The control means for the apparatus is now set whereby the notching dies and cutoff knife 30 will operate automatically to provide a predetermined material length. After setting of the control means, the machine will proceed to cut the material to a specified length and width and will notch the material to round the corners if desired. As will appear from the following description, the apparatus is designed for continuous operation, whereby the above sequence will be repeated, or in a discontinuous manner for a single cutting sequence.

Automatic control means

Figure 3:
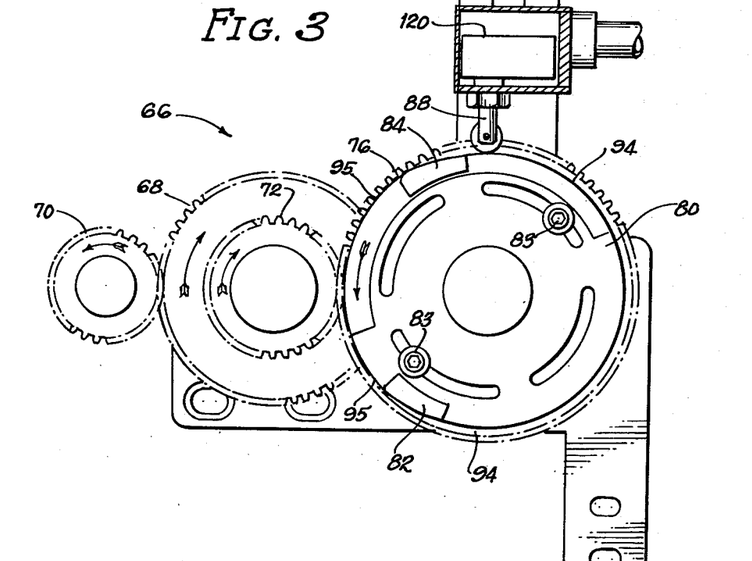
FIGURE 3 is a detail side elevation of an automatic control mechanism forming a specific part of the present invention.
Figure 4:
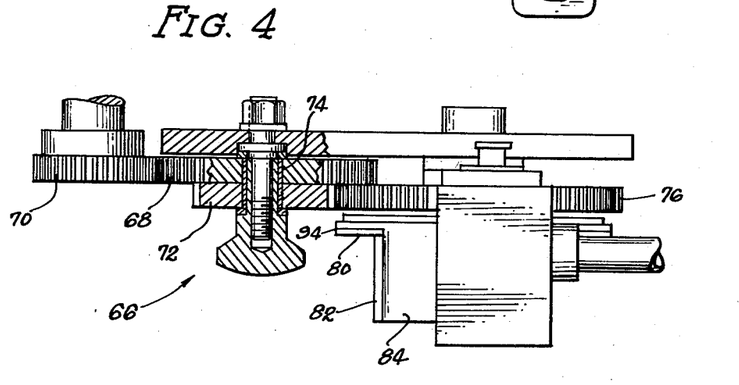
FIGURE 4 is a detail plan view, partly in section, of the control mechanism of FIGURE 3.
Figure 5:
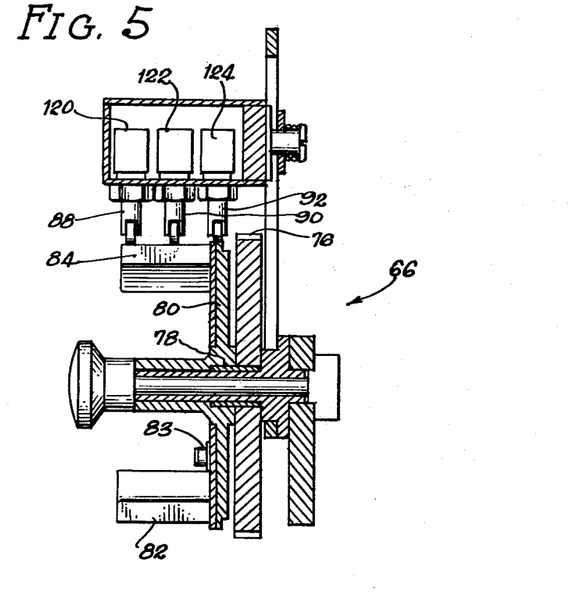
FIGURE 5 is a detail front elevation of the control mechanism of FIGURE 3.

Highly efficient and accurate control means are provided for automatically operating the machine components in their predetermined sequence. The control means 66 is shown in FIGURES 1 and 2 as it appears in relation to the machine. FIGURES 3, 4 and 5 provide detail views of the control means structure.

The control means 66 includes a gear 68 which is meshed with gear 70, the latter being mounted on the axle of the lower roller 12. The gear 68 is co-axially mounted with a gear 72 on the bushing 74 and the gear 72 meshes with gear 76 mounted on bushing 78. It will be apparent that counterclockwise rotation of the gear 70 will result in corresponding counterclockwise rotation of the gear 76 by means of gears 68 and 72.

Also fixed to the bushing 78 for movement along with the gear 76 is a cam element 80 having lugs 82 and 84 associated therewith. The lugs are provided for engagement with actuating means 88, 90 and 92. These actuating means are provided to operate single pole, double throw microswitches which are included in the circuit for the apparatus.

It will be noted that the lugs 82 and 84 are provided with surfaces which gradually taper away from the normal periphery 94 of the cam element 80. Switch actuator 92 rides on the periphery 94, while actuators 88 and 90 hang free except when engaging the lugs 82 and 84. As the lugs 82 and 84 move with respect to the actuators, the actuators will ride up the tapered surface on the lugs and then pass to their normal position. The switches associated therewith are adapted to be opened and closed due to movement of the actuators as they rise and fall upon engagement and release by the lugs. The switch associated with the actuator 92 is, on the other hand, adapted to be closed when approximately the midpoint of the sloping cam lug 82 passes beneath the actuator. This switch will then ride on the raised portion 95 of the rim 94 and remain closed until approximately the midpoint of the oppositely sloping cam lug 84 passes beneath the actuator 92.

The switches associated with the actuators function to initiate various sequential operations of the machine relating to the movement of the material through the machine and relating to the operation of the notching dies 40 and the cutoff knife 30. It will be apparent that the speed of rotation of the cam element 80 will determine the time delay between engagement of the respective lugs with the actuators. Therefore, the cam element speed will determine the time delay between various machine operations which depend on the actuation of the micro-switches connected to the actuators. It will also be obvious that for a given speed of rotation of the rollers 12 and associated gear 70 the speed of the cam element 80 will be determined by the size of gears 72 and 76. Thus, if the gear 72 were enlarged while a smaller gear 76 was provided, an unchanging roller speed (which naturally determines the speed of material 48) would provide an increased speed in the element 80. A decrease in the cam speed can be provided by decreasing the size of gear 72 and increasing the size of gear 76.

Assuming that the material 48 is driven at a constant speed, a greater length of material will pass through the machine in a given cutoff sequence when the element 80 is moving slowly, while the element 80 will initiate the notching and cutoff sequence more rapidly, providing shorter material lengths, when it is moving faster. Accordingly, the mechaanism of this invention provides a highly effiicient means for controlling the size of the material being cut. The length of the material can be varied to any extent, the number of variations depending only on the number of gear combinations available.

Cutoff blade sharpening

Figure 9:
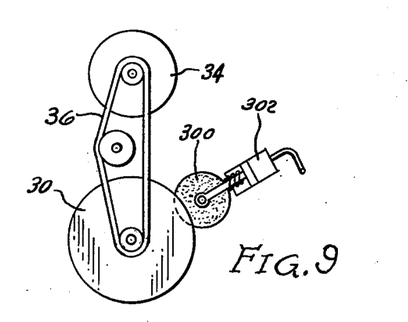
FIGURE 9 is a diagrammatic elevational view of sharpener means which can be employed in the machine of this invention.

The apparatus of this invention includes means for sharpening the cutoff blade for the machine. The sharpening means are adapted to be brought into contact with the rotating blade 30 when this blade is positioned in a rest location on either side of the path of movement of material in the machine. Specifically, sharpening stones are adapted to engage the rotating blade when the cutoff device stops in a rest location and this arrangement will insure keen edges at all times thus providing a clean cut in the material. A suitable arrangement for a sharpener means is illustrated in FIGURE 9 and although the sharpening mechanism, per se, does not form a part of this invention, the novel operating structure of the invention is particularly suitable for incorporating the sharpening steps into the machine operation.

Description of machine circuit and detailed operation of the apparatus

The circuit employed in the cutoff machine of this invention is designed whereby the machine functions can be precisely and efficiently accomplished. The following is provided as an explanation of the circuit, and this description will also serve to specifically define the unique control apparatus of the invention as well as the various notching, trimming, sharpening and cutting mechanisms. In considering the description, it will be noted that FIGURES 7 and 8, illustrating the circuit, properly match when the bottom of FIGURE 7 is joined with the top of FIGURE 8.

Figure 7:
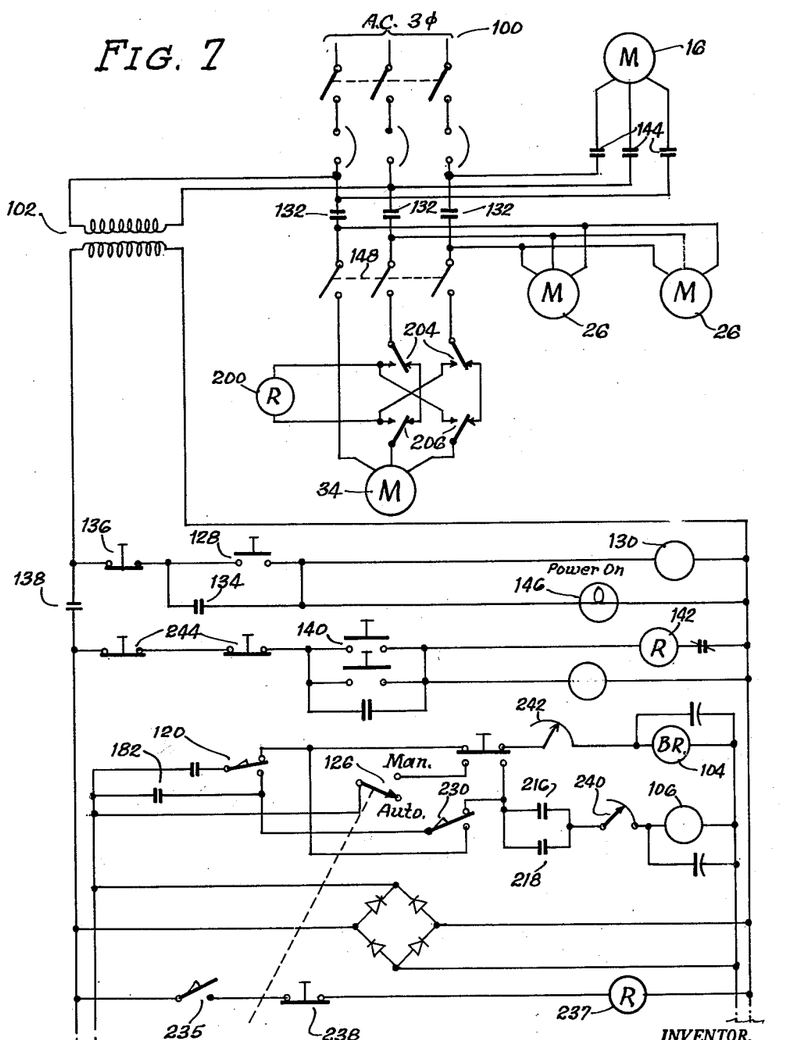
FIGURE 7 illustrates a portion of the circuitry employed in the machine operation.
Figure 8:
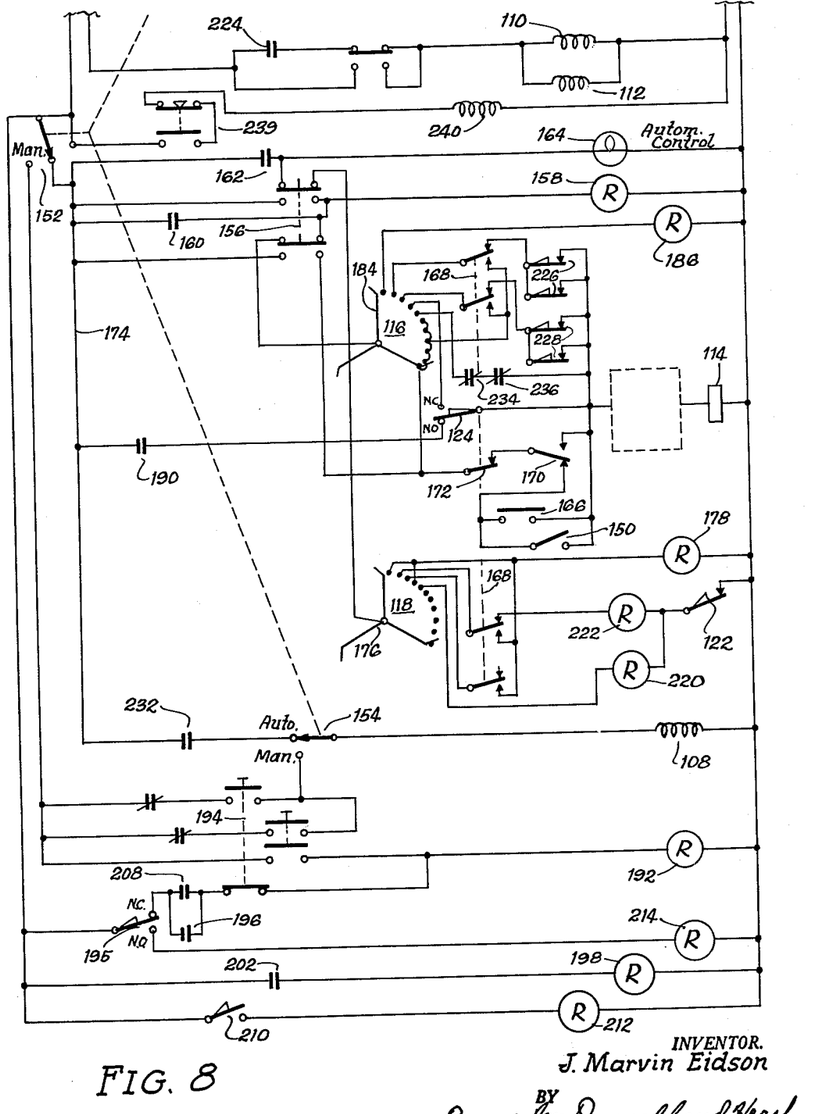
FIGURE 8 illustrates the remainder of the circuit for the machine of this invention.

FIGURES 7 and 8 illustrate schematically motor 16 adapted to drive the rollers 12 and 14. Motors 26 are provided for driving trimming knives 24 and the motor 34 is connected to the cutoff device. An A.C. power source 100 is provided for delivering power to the respective motors.

The power source 100, in addition, is connected to the primary of transformer 102. The remainder of the control circuit for the apparatus is connected across the secondary of this transformer. The remainder of the control circuit includes means adapted to actuate a brake 104 and a clutch 106 for the drive rollers 12 and 14. A solenoid 108 is adapted, when energized, to operate a clutch for the cutoff device. Additional solenoids 110 and 112 are included in the circuit for initiating operation of the notching dies when these are to perform in a cutting cycle. A stepper adapted to be stepped up by the coil 114 includes a front bank 116 and a rear bank 118. The stepper is provided for completing various circuits which initiate operation of the cutting steps.

The actuating means 88, 90 and 92 are provided for respectively controlling micro-switches 120, 122 and 124. As will appear, these micro-switches in turn initiate sequentially various of the machine operations.

In commencing the machine operation, the material to be cut must be initially set up in the machine. First the trimming knives 24 are positioned whereby the desired width of the material will be obtained. The notching assemblies must then be aligned so that the edge of the trimmed material will pass tangent to the radius of the die members 42.

After this initial set up, switch 126, shown in the circuit diagram and positioned on the machine control panel, is placed in the manual position. It will be noted that this "auto-manual" switch 126 is keyed to positions 152 and 154 on the circuit diagram.

After positioning switch 126 in the manual position, push button switch 128 is actuated. This energizes the relay 130 which operates to close switches 132. A holding circuit for the relay 130 is provided through switch 134 which is also closed when the relay 130 is energized and through switch 136. Closing of switches 132 commences running of the motors 26 whereby the trimming knives will rotate.

With the trimming knives rotating, roll release cams 62 are operated to open the rolls 12 and 14, and the material is hand fed through the machine past the trimming knives through the notching dies and between the rear rollers. The end of the material should be positioned over the slot 32 for the cutoff knive 30.

The necessary gears can now be placed in the metering control device whereby a desired length of material will be provided. The position of the cam lugs 82 and 84 must be established in order to provide the desired delap between the various cutting operations.

Switch 138 in the circuit is also closed due to energization of relay 130. Therefore, with the switch 126 in the manual position, switch 140 can be actuated thereby energizing relay 142. This closes switches 144 and delivers power to roll drive motor 16. With the motor 16 operating, the length of material which is metered by one revolution of the two lug cam 80 can be determined. The lug 84 on this cam marks the cutoff point while the lug 82, which is adjustable by means of nuts 83, determines the degree of movement from notching to cutoff.

To commence automatic cycling, the relay 130 must be energized. When employing the initial setup and threading operation described, this relay will be energized and the "power on" light 146 will be on. The toggle switch 148 controlling the cutoff device motor should be thrown after which the continuous run toggle switch 150 is thrown. In addition, the auto-manual switch 126 is moved to automatic position. This action simultaneously operates switches 152 and 154. Pushbutton switch 156 is then actuated to energize relay 158. This operates to close switches 160 and 162, the switch 160 providing a holding circuit for the relay 158. The control set light 164 will turn on at this time signifying that the control circuit is ready.

The main drive motor 16 is started by pushing roll drive pushbutton 140. As suggested in the circuit diagram, the switch 140 can be actuated at two stations, one preferably being on the control box and the other on the opposite side of the machine so that the machine can be stopped from either location.

With the machine set as described, by operating the auto start pushbutton 166 the machine will measure out and cut one panel length. If the notch toggle switch 168 is on, notching will be included in this sequence. If the switch is off, the machine will skip over the notching operation. With the continuous run switch 150 closed, the machine will repeat the cycle continuously. If this switch were permitted to remain open, the machine would stop after an initial cycle until the pushbutton 166 were again actuated.

With the continuous run switch 150 closed, automatic cycling proceeds in the following manner. The switch 150 completes the circuit to the coil 114 in the stepper, through the "off-normal" contacts 170 and interrupter contacts 172, through the front bank 116 of the stepper, through switch 156 and to hot wire 174. This cocks the stepper after which the circuit to the coil 114 is broken by the interrupter contacts. Opening this circuit moves the stepper to the first position.

Upon moving to its first position, the wiper 176 on the rear bank 118 of the stepper completes a circuit to the clutch and brake relay 178. This relay, when energized, breaks the circuit to the electric brake 104 on the feed rollers and completes the circuit to the electrical clutch 106 by opening the normally closed side and closing the normally open side of switch 182. The breaking of the circuit to the brake and completing of the circuit to the clutch sets the rollers 12 and 14 in motion.

At the same time the wiper 176 moves, wiper 184 on the front bank 116 of the stepper completes a circuit to the coil of the cutoff device motor control relay 186. Energization of this relay completes a circuit to the stepper coil 114 through switch 124 by closing switch 190. This again results in cocking of the stepper.

Energization of relay 186 also results in completion of a circuit to the cutoff motor reversing relay 192 by closing switch 196. This circuit is completed through the normally closed side of pushbutton switch 194 and through a reverse lock switch 195. The switch 195 is a mechanically operated switch which is in the normally closed position illustrated if the cutoff device is in a rest location adjacent the control box and opposite the end of slot 34 where the switch 195 is mounted.

When the relap 192 is energized, it reverses the leads to the cutoff motor 34 by operating relay 198 which results in operation of relay 200. Relay 198 is energized when relay 192 operates to close switch 202. Relay 200 is energized when relay 198 moves the contacts of switches 240. Relay 200 completes reversal of the leads to the cutoff motor 34 by moving the contacts 206. Energization of relay 192 also operates to close switch 208, thus completing its own holding circuit through switch 195. This holding circuit will remain closed while the motor 34 moves the cutoff device to the end of its track away from the control box. When the cutoff device reaches this point, the switch 195 will be moved to the normally open position shown, and this will cause the leads on the motor 34 to be again reversed.

If the cutoff device is initially on the end of the track opposite the control box, then the switch 195 will be held in the normally open position and the relay 186 will not energize relay 192 and the motor 34 will, therefore, not be affected.

It will be observed that the switches 210 and 195 provide for operation of relays 212 and 214 respectively. Relays 212 and 214 in turn operate switches 216 and 218 respectively, these switches being in parallel circuits for the clutch 106. Switch 210, like switch 195, is an end limit switch which is closed only when the cutoff device is at the end of its track. Thus, the switch 210 will be positioned adjacent the control box at the opposite end of the slot 34 from the switch 195. With these end limit switches, the circuit to the clutch 106 cannot be completed unless one or the other of the switches 216 and 218 is closed and, therefore, the rollers 12 and 14 cannot operate unless the cutoff device is clear. It will also be apparent that the drive rollers cannot operate when the cutoff device starts, since both switches 216 and 218 will be open as soon as the cutoff device moves.

With the cutoff device at rest, the feed rollers 12 and 14 will rotate and they, in turn, will cause the metering cam element 80 to rotate. When the lug 82 on the cam reaches the switch actuating means 88 and 90, the leading edge of the lug will simultaneously engage these actuating means and move switches 120 and 122 to their normally open sides. Switch 120 completes a circuit to the clutch 106 in parallel with the circuit through switch 182. Switch 122 opens the circuit to the coils of relays 220 and 222. As the cam continues to a point such that the approximate midpoint of lug 82 is beneath the actuator 92, the lug will cause actuator 92 to move switch 124 to its normally closed position. This breaks the circuit to the stepper coil 114 causing the stepper to move to position two. When the stepper leaves position one, one of the above mentioned parallel circuits to the clutch is opened and part of the circuit to the brake 104 is completed (switch 182 reversing). However, since switch 120 is still holding one circuit to the clutch closed and the brake circuit open, the feed rollers continue to turn.

As the stepper moves into position two, the machine is adapted to initiate notching if this operation is to be included in the cycle. However, the notching tool is not able to operate until the lug 82 passes actuators 88 and 90 allowing switches 120 and 122 to return to their normally closed positions.

As switch 120 returns to its normally closed position, the circuit to the clutch 106 is opened and the circuit to the brake 104 is closed, this stopping the feed rollers. As the switch 122 returns to its normally closed position, it completes the circuit to the relays 220 and 222.

If it is desired to operate the notching dies during cycling, the toggle switch 168 must be positioned as shown. With this condition, the rear bank 118 completes the circuit to the notcher relay 222 through the switch 168. When the relay 222 is energized, it operates to close switch 224 completing the circuit to the solenoids 110 and 112 for the two notching mechanisms. The associated pneumatic mechanisms drive the pistons 56 and associated dies 52 down to cut the material. At the same time, the front bank 116 at station two has completed a circuit to the coil 114 through a parallel connection of the two mechanical notcher release switches 226. This cocks the stepper and when the two notching dies reach the bottom of their stroke, the mechanical switches 226 will be opened breaking the circuit to the coil 114 and advancing the stepper to the third station. As the stepper moves off the second station, it breaks the circuit to the relay 222 which breaks the circuit to the solenoids 110 and 112. This releases air from the pneumatic mechanisms allowing them to move upwardly. When the stepper moves to position three, the front bank 116 completes a circuit to the coil 114 through mechanical switches 228, this cocking the stepper. When both notching dies reach the top of their stroke, they are adapted to open the mechanical switches 228 thus breaking the circuit to the coil 114 and causing the stepper to advance to position four.

In a case where it is desired to skip the notching operation, toggle switch 168 is placed in a position opposite that shown on the drawings. The cycle of operation is the same up to the description of the notching cycle. However, with the switch 168 in this position, relay 178 will be energized when the rear bank 118 is at stations two and three. This completes the circuit to the clutch 106 and opens the circuit to the brake 104, this causing the feed rollers to turn. Concurrently, the front bank 116 on stations two and three completes a circuit to the coil 114 through the interrupter contacts 172. These interrupter contacts cause the stepper to advance to station four at the rate of about 230 steps per minute. This will take place so rapidly that when the machine is set to "not notch" there is no perceptible change in current to the clutch 106. Consequently there will be no significant change in the speed of the rollers as the stepper skips over the notching operation.

In position four, the rear bank 118 completes the circuit to the relay 178. Relay 178 reverses the contacts in switch 182 thus completing the circuit to the clutch 106 through switch 230. This also opens the circuit to the brake 104 causing the feed rollers to continue turning. At the same time, the front bank 116 completes a circuit to the coil 114 through the normally closed side of switch 124 positioned over the metering cam 80. This switch has been held closed since actuator 92 is riding on the raised portion 95 between lugs 82 and 84. When coil 114 is energized, the stepper will be cocked.

As the lug 84 on the cam reaches the switch actuators, it will first cause switches 120 and 122 to move to their normally open sides. Switch 120 completes a circuit to the clutch 106 through switch 182 and switch 122 opens the circuit to the relays 220 and 222. The next increment of movement of the cam causes actuator 92 to move switch 124 to its normally open position, the actuator 92 now coming off the raised portion 95. This breaks the circuit to the coil 114 causing the stepper to move to position five. As the stepper leaves position four, a circuit to the clutch 106 is opened and part of the circuit to the brake 104 is completed. Since switch 120 is still holding one circuit to the clutch closed and the brake circuit open, the feed rollers will continue to turn.

As the stepper moves into position five, the rear bank 118 completes part of the circuit to the relay 220 and the circuit is completed when the cam 84 moves to permit switches 120 and 122 to return to their normally closed positions. As switch 120 returns to its normally closed position, it will break the circuit to the clutch and complete the circuit to the brake stopping the feed rolls. Energization of the relay 220 results in closing of switch 232 completing a circuit to the solenoid 108 for the cutoff device air valve. The valve for the cutoff device is preferably a three-way, normally open air valve supplying air to the cutoff device. When the valve is energized, it shuts off the air supply and exhausts the air from the cylinders on the cutoff device. When the air is exhausted from the cutoff device, it releases an air operated brake and engages the spring loaded clutch causing the cutoff device to start its motion. Since the cutoff device moves off an end limit switch 210 or 195, the cutoff coil 114 is completed through the front bank of the stepper and through normally closed switches 234 and 236. These switches are controlled by relays 212 and 214 respectively, and both switches are closed only when both of these relays are deenergized. It will be apparent that this is the case only when the cutoff device is located away from both of the limit switches 195 and 210.

The stepper is now cocked and when the cutoff device reaches the end of the track opposite its starting position, either switch 195 or 210 will be moved whereby one of the relays 212 and 214 will be energized. This will break the circuit to the coil 114 since either switch 234 or 236 will open and the stepper will therefore move to position six. In addition, the relay 220 will be deenergized and switch 232 opened, this action deenergizing the cutoff clutch solenoid 108.

If the cutoff device starts from the end of the track nearest the control box, it will move the end limit and reversing switch 195 to the normally open position. In this position of the switch 195, the holding circuit for the coil 192 is broken and this results in opening of switch 202, deenergization of relay 193 which, in turn, results in reversal of the leads to the cutoff device motor 34. Therefore, on the next cycle, when the relay 186 is energized on step one of the stepper, the circuit to the coil 192 will not be completed and the leads of motor 34 will not be reversed.

If the cutoff device starts from the end of the track away from the control box, when it reaches the end near the control box the switch 210 will be operated to energize relay 212 and open switch 234. In addition, the cutoff device in this location is adapted to close mechanically switch 235 whereby sharpener relay 237 will be energized through manual sharpener pushbutton 238. Energization of relay 237 results in closing of switch 239 whereby the sharpener air valve solenoid 240 is energized. This circuit to the solenoid 240 is completed through the normally open non-timed contacts of switch 239 and through the normally closed timed-break contacts of switch 239, this starting a pneumatic timing device for the relay 237. When the sharpener air valve is actuated air will be put into cylinders of three sharpeners which will cause stones to move down and contact the cutoff blade. The blade will be sharpened while turning in the rest position. When the pneumatic timer breaks the contacts of switch 239, the sharpening device will be stopped. In accordance with this invention, it is preferable to provide sharpening only on every other cycle, that is, only when the cutoff device is near the control box.

FIGURE 9 illustrates a sharpener stone 300 which represents a typical arrangement which can be utilized in providing the sharpener means. The air cylinder 302 is adapted to be operated in the manner above described to cause the stone 300 to move into contact with the cutoff blade 30. As discussed above, three such stones could be employed to provide effective sharpening. A single sharpening means is illustrated for convenience.

On stations six through ten the circuit to the coil 114 of the stepper is completed through the front bank of the stepper and through the interrupter contacts 172 and "off-normal" contacts 170. This causes the stepper to move at the rate of 230 steps per minute through each of the last five stations. When it reaches the tenth station, the off-normal contacts 170 will be opened by a cam causing the stepper to stop. At this point a new cycle will commence if the continuous run switch 150 is closed. If this switch is open, the machine will stop.

The speed of operation of the electric clutch 106 and the brake 104 may be adjusted by the rheostats 240 and 242, respectively. Increasing the resistance will slow down the operation of these mechanisms.

If at any time the stepper is stopped at an intermediate point, the device can be readily restored to a starting condition. This can be accomplished by holding switch 156 down whereby a circuit to the coil 114 will be completed through interrupter contacts 172 which causes the stepper to advance at the rate of 230 steps per minute until the contacts 170 stop the stepper. Pushing of switch 156 opens the supply circuit to both banks of the steppers preventing any operations from occurring while the stepper is homing.

In the event material passing into the machine is impeded in its progress in any way, the machine is adapted to provide for interruption of the cutting operation. Specifically, undue tension in the material entering the machine will cause the material to lift bars adjacent the front of the machine. This will result in mechanical opening of switch 230 breaking the circuit to the clutch, thus stopping the rollers instantly. In addition, pushbutton switches 244 can be provided at a pair of locations on the machine for stopping the roll drive motor 16 at any time this is deemed necessary. In the event of an electrical failure, the machine will not restart until the pushbutton switch 128 is actuated whereby the relay 130 can be reenergized. The machine will start a new cycle irregardless of where the preceding cycle was interrupted. The end limit switches 195 and 210, mounted on the track for the cutoff device, are provided for controlling the stopping position of the device. The switch 210 on top of the track near the control box, and the switch 195 on the opposite end, may be adjustably positioned along the track to change the stopping position of the cutoff device. Positive stops can be provided in the track; however, the switches are adapted to be set so that the cutoff device will stop short of these stops.

It will be understood that various modifications can be made in the above described apparatus which provide the characteristics of this invention without departing from the spirit thereof, particularly as defined in the following claims.

I claim:

1. In an apparatus for cutting material into specific lengths including driving means for passing the material through said apparatus and cutoff means adapted to cut the material transversely to provide said lengths, the improvement comprising automatic control means adapted to initiate operation of said cutoff means, said control means being connected to said drive means whereby the cycling speed of said control means is determined by the speed of the drive means, a plurality of operating means carried by said control means, means engageable by one of said operating means for controlling the movement of said material through said apparatus, means engageable by another of said operating means for controlling operation of said cutoff means, means for adjusting the relative position of said operating means on said control means to thereby alter the time period between the material movement and cutoff operations, and means for adjusting the relative speed of said drive means and said control means.

2. An apparatus according to claim 1 including means for trimming the edges of said material as it is driven through the machine.

3. In an apparatus for cutting material into specific lengths including drive means for passing the material through the apparatus, notching means adapted to notch out pieces of the material on opposite sides and cutoff means adapted to cut the material transversely to provide said lengths, the improvement comprising automatic control means adapted to initiate operation of said notching means and said cutoff means, said control means being connected to said driving means whereby the cycling speed of said control means is determined by the speed of said drive means, a plurality of operating means carried by said control means, means engageable by one of said operating means controlling the movement of said material through said apparatus, means engageable by another of said operating means for controlling operation of said cutoff means, means engageable by additional operating means for controlling operation of said notching means, means for adjusting the relative positions of said operating means on said control means to thereby alter the time period between the material movement and the notching and cutoff operations, and means for adjusting the relative speed of said drive means and said control means.

4. An apparatus according to claim 3 wherein the operating means on said control means are engageable with switch actuating means and associated switches, said switches being adapted to stop said drive means when said material is to be notched and to again stop said drive means when the notched portions have been moved into the path of said cutoff means.

5. An apparatus according to claim 4 wherein the notching means is designed whereby the resulting material lengths will have rounded corners.

6. In a material cutting machine including drive means for passing the material through the machine and cutoff means adapted to cut the material transversely to provide specific lengths thereof, the improvement comprising control means adapted to initiate operation of said cutoff means in timed sequence depending on the speed of said drive means, said control means including a first gear operating in response to said drive means and a second gear meshing with said first gear, means associated with said second gear for operating switch actuating means, and switches connected to said actuating means for initiating operation of said cutoff means, said gears being replaceable whereby the relative speeds of said drive means and said control means can be varied.

7. In a material cutting machine including driving means for passing the material through said machine, notching means adapted to notch out pieces of the material on opposite sides and cutoff means adapted to cut the material transversely to provide specific lengths thereof, the improvement comprising control means adapted to initiate operation of said notching means and said cutoff means in timed sequence depending on the speed of said driving means, said control means including a first gear operating in response to said driving means and a second gear meshing with said first gear, means associated with said second gear for operating switch actuating means and switches connected to said switch actuating means for initiating operation of said notching means and cutoff means, said gears being replaceable whereby the relative speeds of said driving means and said control means can be varied.

8. In a material cutting machine including drive means for passing said material through said machine and cutoff means adapted to cut the material transversely to provide specific lengths thereof, the improvement comprising control means adapted to initiate operation of said cutoff means in timed sequence depending on the speed of said drive means, said control means including a first gear operating in response to said drive means and a second gear meshing with said first gear, cam means connected to said second gear for rotation therewith, switch actuating means for engagement by said cam means, said switch actuating means opening and closing switches associated therewith, and said switches being operative to initiate operation of said cutoff means, said gears being replaceable whereby the relative speed of said drive means and said control means can be varied.

9. A machine according to claim 8 including means for trimming the edges of said material as it is driven through the machine and means for notching the material on opposite sides thereof, said control means and associated switches being adapted to operate said notching means in timed sequence depending on the speed of said drive means.

10. In an apparatus for cutting material into specific lengths including driving means for passing the material through the apparatus, notching means adapted to notch out pieces of the material on opposite sides and cutoff means adapted to cut the material transversely to provide said lengths, the improvement comprising automatic control means adapted to initiate operation of said notching means and said cutoff means, said control means being connected to said driving means whereby the cycling speed of said control means is determined by the speed of said driving means, means for adjusting the relative speed of said driving means and said control means, cam means included in said control means, switch actuating means each associated with a single switch, said cam means being aadpted to sequentially engage said switch actuating means whereby said switches are adapted to sequentially stop said driving means when said material is to be notched, initiate operation of said notching means, restart said driving means, again stop said driving means when said notched portions are opposite said cutoff means and initiate operation of said cutoff means.

11. An apparatus according to claim 10 including means for eliminating the notching operation, said control means being adapted to bypass said notching operation without interrupting the operation of said driving means.

12. In a material cutting machine including driving means for passing the material through the machine and cutoff means adapted to cut the material transversely to provide specific lengths thereof, the improvement comprising control means adapted to initiate operation of said cutoff means in timed sequence depending on the speed of said driving means, said control means including a first gear operating in response to said driving means and a second gear meshing with said first gear, three switch actuating means each associated with a single switch, cam means driven by said second gear for operating said switch actuating means, said cam means being adapted to sequentially engage said actuating means whereby said switches are adapted to sequentially stop said driving means when said material is to be notched, initiate operation of said notching means, restart said driving means, stop said driving means when said notched portions are opposite said cutoff means and initiate operation of said cutoff means, said gears being replaceable whereby the relative speeds of said driving means and said control means can be varied.

13. In a material cutting machine including drive means for passing said material through said machine and cutoff means adapted to cut the material transversely to provide specific lengths thereof, the improvement comprising control means adapted to initiate operation of said cutoff means in timed sequence depending on the speed of said drive means, said control means including a first gear operating in response to said drive means and a second gear meshing with said first gear, cam means connected to said second gear for rotation therewith, switch actuating means for engagement by said cam means, said switch actuating means opening and closing switches associated therewith, and said switches being operative to initiate operation of said cutoff means, said gears being replaceable whereby the relative speed of said drive means and said control means can be varied, and wherein said cutoff means comprises a rotary blade, means for moving said blade transversely across said apparatus to effect cutting of said material and wherein said cutoff means is provided with rest locations on either side of the path of movement of said material, and including blade sharpening means positioned adjacent one of said rest locations, said sharpening means being adapted to be actuated by said control means for sharpening said cutoff means when the cutoff means stop in said one location.

14. In a material cutting machine including drive means for passing said material through said machine and cutoff means adapted to cut the material transversely to provide specific lengths thereof, the improvement comprising control means adapted to initiate operation of said cutoff means in timed sequence depending on the speed of said drive means, said control means including a first gear operating in response to said drive means and a second gear meshing with said first gear, cam means connected to said second gear for rotation therewith, switch actuating means for engagement by said cam means, said switch actuating means opening and closing switches associated therewith, and said switches being operative to initiate operations of said cutoff means, said gears being replaceable whereby the relative speed of said drive means and said control means can be varied, and wherein said cutoff means comprises a rotary blade, means for moving said blade transversely across said apparatus to effect cutting of said material, and wherein said cutoff means are provided with rest locations on either side of the path of movement of said material, and including limit switches positioned in said locations, one of said switches being adapted to be closed whenever said cutoff means is at rest in one of said locations, said control means being ineffective to initiate operation of said drive means unless one of said limit switches is closed.

References Cited in the file of this patent
UNITED STATES PATENTS

| | | |
|---|---|---|
| 1,462,138 | Langston | July 17, 1923 |
| 1,812,406 | Jenkins | June 30, 1931 |
| 2,216,629 | Sabel | Oct. 1, 1940 |
| 2,777,521 | Tanis | Jan. 15, 1957 |

FOREIGN PATENTS

| | | |
|---|---|---|
| 470,523 | Canada | Jan. 2, 1951 |
| 1,059,288 | Germany | June 11, 1959 |